(12) United States Patent
Zeng et al.

(10) Patent No.: US 11,395,234 B2
(45) Date of Patent: Jul. 19, 2022

(54) METHOD FOR UPLINK POWER CONTROL, NETWORK NODE AND SYSTEM

(71) Applicant: Huawei Technologies Co., Ltd., Shenzhen (CN)

(72) Inventors: Qinghai Zeng, Shenzhen (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 14/478,842

(22) Filed: Sep. 5, 2014

(65) Prior Publication Data

US 2015/0005027 A1    Jan. 1, 2015

Related U.S. Application Data

(63) Continuation of application No. PCT/CN2013/073059, filed on Mar. 22, 2013.

(30) Foreign Application Priority Data

Mar. 23, 2012  (CN) .......................... 201210081742.2

(51) Int. Cl.
*H04W 52/14* (2009.01)
*H04W 52/40* (2009.01)
(Continued)

(52) U.S. Cl.
CPC ....... *H04W 52/146* (2013.01); *H04W 52/367* (2013.01); *H04W 52/40* (2013.01); *H04W 72/1278* (2013.01); *H04W 52/346* (2013.01)

(58) Field of Classification Search
CPC . H04W 52/146; H04W 52/40; H04W 52/367; H04W 72/1278; H04W 52/346
(Continued)

(56) References Cited

U.S. PATENT DOCUMENTS 5,960,353 A  *  9/1999  Lee .................... H04W 52/06
                                                       455/444
2006/0019694 A1   1/2006  Sutivong et al.
(Continued)

FOREIGN PATENT DOCUMENTS

CN    101002398 A    7/2007
CN    101036314 A    9/2007
(Continued)

OTHER PUBLICATIONS

Samsung et al., "Cross-Carrier Group UL PC for LTE-A," 3GPP TSG RAN WG1 Meeting #64, Agenda Item 6.2.1, Taipei, Taiwan, Feb. 2011, R1-110731, 3 pages.
(Continued)

*Primary Examiner* — Ankur Jain
(74) *Attorney, Agent, or Firm* — Gregg L. Jansen

(57) ABSTRACT

Embodiments of the present invention disclose a method for uplink power control, a network node and a system, which relates to the field of communication technologies, and the method includes: a first network node transmits a first indication message to a second network node, wherein the first indication message includes a time pattern and/or a maximum transmission power for an uplink transmission performed by a user equipment (UE) on the second network node, and the time pattern is used for controlling a transmission time of the uplink transmission performed by the UE. The present invention is applicable to uplink power control for the user equipment UE in a carrier aggregation scenario.

16 Claims, 8 Drawing Sheets

A first network node transmits a first indication message to a second network node, where the first indication message includes a time pattern and/or a maximum transmission power for an uplink transmission performed by a user equipment (UE) on the second network node, and the time pattern is used for controlling a transmission time of the uplink transmission performed by the UE — 101

(51) Int. Cl.
*H04W 52/36* (2009.01)
*H04W 72/12* (2009.01)
*H04W 52/34* (2009.01)

(58) Field of Classification Search
USPC ........................................................ 455/522
See application file for complete search history.

(56) References Cited

U.S. PATENT DOCUMENTS

| | | | | |
|---|---|---|---|---|
| 2006/0045046 | A1* | 3/2006 | Kim | H04W 52/146 |
| | | | | 370/329 |
| 2011/0039569 | A1* | 2/2011 | Narasimha | H04W 52/10 |
| | | | | 455/452.2 |
| 2011/0275403 | A1 | 11/2011 | Chen et al. | |
| 2011/0310781 | A1 | 12/2011 | Kim et al. | |
| 2012/0040707 | A1 | 2/2012 | Kim et al. | |
| 2012/0120821 | A1* | 5/2012 | Kazmi | H04W 56/0005 |
| | | | | 370/252 |
| 2015/0085714 | A1 | 3/2015 | Liang et al. | |

FOREIGN PATENT DOCUMENTS

| | | |
|---|---|---|
| CN | 101340622 A | 1/2009 |
| CN | 101399572 A | 4/2009 |
| CN | 101534180 A | 9/2009 |
| CN | 101827370 A | 9/2010 |
| CN | 101998604 A | 3/2011 |
| CN | 102065530 A | 5/2011 |
| CN | 102098151 A | 6/2011 |
| EP | 2317816 A1 | 5/2011 |
| WO | WO 2010/106227 A1 | 9/2010 |
| WO | WO 2011/119750 A1 | 9/2011 |

OTHER PUBLICATIONS

3GPP TS 36.413 V10.5.0 (Mar. 2012), 3rd Generation Partnership Project; Technical Specification Group Radio Access Network; Evolved Universal Terrestrial Radio Access Network(E-UTRAN); S1 Application Protocol (S1AP)(Release 10), 255 pages.

3GPP TS 36.331 V10.5.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 10), 302 pages.

3GPP TSG-RAN WG3 #74, R3-113022, "Carrier-based HetNet ICIC for DL interference scenario", Qualcomm Incorporated, Nov. 14-18, 2011, 6 pages.

* cited by examiner

A first network node transmits a first indication message to a second network node, where the first indication message includes a time pattern and/or a maximum transmission power for an uplink transmission performed by a user equipment (UE) on the second network node, and the time pattern is used for controlling a transmission time of the uplink transmission performed by the UE — 101

FIG. 1

A second network node receives a first indication message transmitted by a first network node, where the first indication message includes a time pattern and/or a maximum transmission power for an uplink transmission performed by a user equipment (UE) on the second network node — 201

The second network node limits scheduling of the uplink transmission performed by the UE to the time pattern and/or the maximum transmission power, according to the first indication message — 202

FIG. 2

METHOD FOR UPLINK POWER CONTROL, NETWORK NODE AND SYSTEM

CROSS-REFERENCE TO RELATED APPLICATIONS

This application is a continuation of International Application No. PCT/CN2013/073059, filed on Mar. 22, 2013, which claims priority to Chinese Patent Application No. 201210081742.2, filed on Mar. 23, 2012, both of which are incorporated herein by reference in their entireties.

TECHNICAL FIELD

The present invention relates to the field of communication technologies and, in particular, to a method for uplink power control, a network node and a system.

BACKGROUND

CA (Carrier Aggregation, carrier aggregation) within one base station is supported in Release-10 (version 10) of the 3GPP (3rd Generation Partnership Project, the 3rd Generation Partnership Project) LTE (Long Term Evaluation, long term evolution) system, where the carrier aggregation means that multiple carriers with a relatively narrowband aggregate into a wider spectrum, so as to satisfy spectrum requirements of the LTE system. The CA within one base station can support the carrier aggregation of five cells at most, that is, one UE (User Equipment, user equipment) can perform data transmission simultaneously on five cells at most. For a UE working in a CA state, a cell of the system to which the UE initially accesses is called a PCell (Primary Cell, primary cell), then an SCell (Secondary Cell, secondary cell) may be added, modified or deleted through an RRC (Radio Resource Control, radio resource control) reconfiguration process, and the PCell may be changed through a handover process.

During the carrier aggregation, each serving cell of the UE is configured with maximum transmission power, where the control of the transmission power of the UE is called uplink power control, so as to ensure that an uplink signal can be decoded correctly at a base station and meanwhile cannot interfere transmission of other UEs or systems. The UE transmits a PHR (Power HeadRoom, power headroom report) through the uplink transmission, and the base station adjusts the transmission power of the subsequent uplink transmission of the UE according to the PHR.

The prior art at least has the following problems: there is a mechanism of providing the carrier aggregation for multiple base stations, however, there is not an effective solution for performing scheduling to uplink power of the UE by multiple base stations simultaneously, therefore, the uplink transmission power of the UE cannot satisfy transmission power requirements of multiple base stations and, thus, the transmission fails and the transmission efficiency is reduced; in addition, if all the base stations adopt conservative scheduling, that is, let the UE adopt the uplink transmission power which can satisfy all the base stations, in this case, the carrier resources cannot be fully utilized.

SUMMARY

Embodiments of the present invention provide a method for uplink power control, a network node and a system, which can solve the problem that uplink transmission power of the UE in a carrier aggregation scenario cannot satisfy requirements of all base stations while fully utilize carrier resources.

The following technical solutions are provided in the embodiments of the present invention:

A method for uplink power control, including:

transmitting, by a first network node, a first indication message, to a second network node, where the first indication message includes a time pattern and/or maximum transmission power for an uplink transmission performed by a user equipment (UE) on the second network node, and the time pattern is used for controlling a transmission time of the uplink transmission performed by the UE.

A method for uplink power control, including:

receiving, by a second network node, a first indication message transmitted by a first network node, where the first indication message includes a time pattern and/or a maximum transmission power for an uplink transmission performed by a user equipment (UE) on the second network node; and limiting, by the second network node, scheduling of the uplink transmission performed by the UE to the time pattern and/or the maximum transmission power, according to the first indication message.

A network node, including:

a first indication message transmitting unit, configured to transmit a first indication message, to a second network node, where the first indication message includes a time pattern and/or maximum transmission power for an uplink transmission performed by a user equipment (UE) on the second network node, and the time pattern is used for controlling a transmission time of the uplink transmission performed by the UE.

A network node, including:

a first indication message receiving unit, configured to receive a first indication message transmitted by a first network node, where the first indication message includes a time pattern and/or a maximum transmission power for an uplink transmission performed by a user equipment (UE) on the second network node; and a processing unit, configured to limit scheduling of the uplink transmission performed by the UE to the time pattern and/or the maximum transmission power, according to the first indication message.

A communication system, including: a first network node and a second network node.

Compared with the prior art, in the embodiments of the present invention, the first network node indicates, to the UE under the second network node, the time pattern and/or the maximum transmission power which is needed for performing the uplink transmission, so as to realize the uplink power control to the UE, thereby ensuring that the UE can satisfy the transmission power requirements of each base station in a carrier aggregation scenario and, thus, the uplink transmission is performed successfully.

BRIEF DESCRIPTION OF DRAWINGS

To illustrate the technical solutions in embodiments of the present invention more clearly, accompanying drawings needed in the embodiments or the prior art are illustrated briefly in the following. Apparently, the accompanying drawings show certain embodiments of the present invention, and persons skilled in the art can derive other drawings from them without creative efforts.

FIG. 1 is a flowchart of a method for uplink power control according to Embodiment 1 of the present invention;

FIG. 2 is a flowchart of a method for uplink power control according to Embodiment 2 of the present invention;

DESCRIPTION OF EMBODIMENTS

Figure 3:
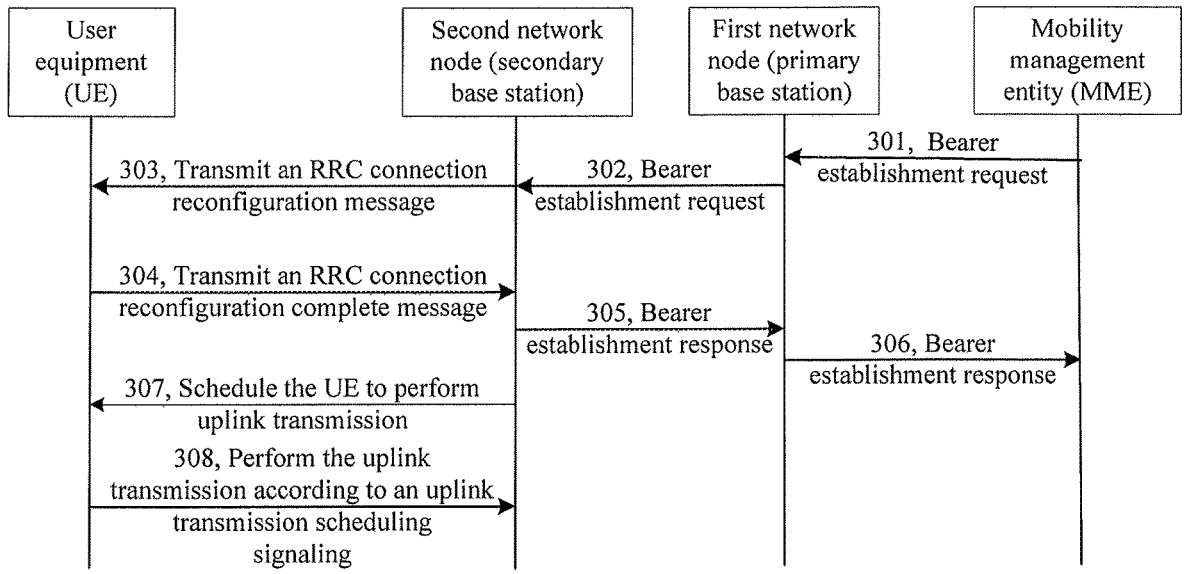
FIG. 3 is a flowchart of a method for uplink power control according to Embodiment 3 of the present invention.

The technical solutions in the embodiments of the present invention are hereinafter described clearly and completely with reference to the accompanying drawings in the embodiments of the present invention. Obviously, the embodiments described here are part of the embodiments of the invention and not all of the embodiments. All other embodiments, which can be derived by persons skilled in the art from the embodiments given herein without creative efforts, shall fall within the protection scope of the present invention.

In order to make the advantages of technical solutions of the present invention more comprehensible, a detailed description is given below with reference to the embodiments and accompanying drawings.

Embodiment 1

This embodiment provides a method for uplink power control, as shown in FIG. 1, the method includes:

101, a first network node transmits a first indication message to a second network node, where the first indication message includes a time pattern and/or a maximum transmission power for an uplink transmission performed by a user equipment (UE) on the second network node, and the time pattern is used for controlling a transmission time of the uplink transmission performed by the UE.

Optionally, before the first network node transmits the first indication message to the second network node, the method further includes: the first network node receives a second indication message transmitted by the UE, where the second indication message is used for indicating that uplink data, which is buffered by the UE and to be transmitted to the second network node, exceeds a first predetermined threshold; and the first network node determines the time pattern and/or the maximum transmission power for the uplink transmission performed by the UE on the second network node.

Optionally, before the first network node transmits the first indication message to the second network node, the method further includes: the first network node receives a first request message transmitted by the second network node, where the first request message is used for requesting the first network node to configure the time pattern and/or the maximum transmission power for the UE; and the first network node determines the time pattern and/or the maximum transmission power for the uplink transmission performed by the UE on the second network node, where, the time pattern may be a subframe pattern (bitmap), the first request message includes a subframe pattern, the number of subframes, maximum transmission power, the adjusted number of subframes or adjusted maximum transmission power. The subframe pattern may be a TTI (Transmission Time Interval, transmission time interval) in milliseconds, for example, for a subframe pattern with a period of 10 milliseconds, 1-5 milliseconds are used for providing time control for a primary base station, which is represented as 00000, and 6-10 milliseconds are used for providing time control for a secondary base station, which is represented as 11111.

Before the first network node transmits the first indication message to the second network node, the method further includes: the first network node receives a second request message transmitted by a mobility management entity (MME), where the second request message includes adding, modifying or deleting a radio bearer between the UE and the second network node.

Optionally, the method further includes: the first network node receives a third indication message transmitted by the UE, where the third indication message is used for indicating that there is no uplink data in a transmission buffer of the second network node or data amount of the transmission buffer of the second network node is lower than a second predetermined threshold; and the first network node transmits a third request message to the second network node, where the third request message is used for requesting the second network node to stop scheduling the uplink transmission performed by the UE at the time pattern and/or the maximum transmission power.

Optionally, the method further includes: the first network node receives a fourth indication message transmitted by the UE, where the fourth indication message is used for indicating that a transmission buffer of the second network node is changed from a state of having no uplink data to a state of having uplink data, or the data amount of the transmission buffer of the second network node exceeds a second predetermined threshold; and the first network node transmits a fourth request message to the second network node, where the fourth request message is used for requesting the second network node to resume scheduling the uplink transmission performed by the UE at the time pattern and/or the maximum transmission power.

Optionally, the method further includes: the first network node receives a fifth indication message transmitted by the UE, where the fifth indication message is used for indicating that there is no uplink data in a transmission buffer of the first network node or data amount of the transmission buffer of the first network node is lower than a third predetermined threshold; and the first network node transmits a fifth request message to the second network node, where the fifth request message is used for requesting the second network node to stop the restriction of scheduling the uplink transmission performed by the UE at the time pattern and/or the maximum transmission power.

Optionally, the method further includes: the first network node receives a sixth indication message transmitted by the UE, where the sixth indication message is used for indicating that a transmission buffer of the first network node is changed from a state of having no uplink data to a state of having uplink data, or the data amount of the transmission buffer of the first network node exceeds the second predetermined threshold; and the first network node transmits a sixth request message to the second network node, where the sixth request message is used for requesting the second network node to resume the restriction of scheduling the uplink transmission performed by the UE at the time pattern and/or the maximum transmission power.

It should be noted that, the first network node and the second network node may be a base station, a workstation, a server or the like; in this embodiment, the first network node is a primary base station, and the second network node is a secondary base station.

Throughout embodiments of the present description, the total resources of the primary base station and the secondary base station are constant, when the UE is adjusted to satisfy the transmission power requirements of the secondary base station, the transmission power of the UE to the primary base station is simultaneously adjusted, that is, the transmission power requirements of the primary base station is satisfied simultaneously.

Compared with the prior art, in this embodiment of the present invention, the primary base station indicates, to the user equipment (UE) under the secondary base station, the time pattern and/or the maximum transmission power which is needed for performing the uplink transmission, so as to realize the uplink power control to the UE, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 2

This embodiment provides a method for uplink power control, as shown in FIG. 2, the method includes:

201, a second network node receives a first indication message transmitted by a first network node, where the first indication message includes a time pattern and/or a maximum transmission power for an uplink transmission performed by a user equipment (UE) on the second network node; and 202, the second network node limits scheduling of the uplink transmission performed by the UE to the time pattern and/or the maximum transmission power, according to the first indication message.

Optionally, before the second network node receives the first indication message transmitted by the first network node, the method further includes: the second network node receives a second indication message transmitted by the UE, where the second indication message is used for indicating that uplink data, which is buffered by the UE and to be transmitted to the second network node, exceeds a first predetermined threshold; and the second network node transmits a first request message to the first network node, where the first request message is used for requesting the first network node to configure the time pattern and/or the maximum transmission power for the UE.

Optionally, after the second network node limits the scheduling of the uplink transmission performed by the UE to the time pattern and/or the maximum transmission power according to the first indication message, the method further includes: the second network node receives a third request message transmitted by the first network node, where the third request message is used for requesting the second network node to stop scheduling the uplink transmission performed by the UE at the time pattern and/or the maximum transmission power; and the second network node transmits a third request response message to the first network node, and the second network node stops scheduling the uplink transmission performed by the UE at the time pattern and/or the maximum transmission power after transmitting the third request response message.

Optionally, after the second network node limits the scheduling of the uplink transmission performed by the UE at the time pattern and/or the maximum transmission power according to the first indication message, the method further includes: the second network node receives a fourth request message transmitted by the first network node, where the fourth request message is used for requesting the second network node to resume scheduling the uplink transmission performed by the UE at the time pattern and/or the maximum transmission power; and the second network node transmits a fourth request response message to the first network node, and the second network node resumes scheduling the uplink transmission performed by the UE at the time pattern and/or the maximum transmission power after transmitting the third request response message.

Optionally, after the second network node limits the scheduling of the uplink transmission performed by the UE to the time pattern and/or the maximum transmission power according to the first indication message, the method further includes: the second network node transmits a seventh request message to the first network node when the second network node receives the third indication message transmitted by the UE, where both the third indication message and the seventh request message are used for indicating that there is no uplink data in a transmission buffer of the second network node or data amount of the transmission buffer of the second network node is lower than the second predetermined threshold; and the second network node receives a seventh request response message transmitted by the first network node, where the seventh request response message is used for indicating the second network node to stop scheduling the uplink transmission performed by the UE at the time pattern and/or the maximum transmission power.

Optionally, after the second network node limits the scheduling of the uplink transmission performed by the UE to the time pattern and/or the maximum transmission power according to the first indication message, the method further includes: the second network node transmits an eighth request message to the first network node when the second network node receives the fourth indication message transmitted by the UE, where both the fourth indication message and the eighth request message are used for indicating that a transmission buffer of the second network node is changed from a state of having no uplink data to a state of having uplink data, or the data amount of the transmission buffer of the second network node exceeds a second predetermined threshold; and the second network node receives an eighth request response message transmitted by the first network node, where the eighth request response message is used for indicating the second network node to resume scheduling the uplink transmission performed by the UE at the time pattern and/or the maximum transmission power.

It should be noted that, the first network node and the second network node may be a base station, a workstation, a server or the like; in this embodiment, the first network node is a primary base station, and the second network node is a secondary base station.

Compared with the prior art, in this embodiment of the present invention, the secondary base station receives the uplink power indication transmitted by the primary base station, and performs corresponding power control to the UE according to the uplink power indication, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 3

This embodiment provides a method for uplink power control, where a first network node is a primary base station, and a second network node is a secondary base station, as shown in FIG. 3, the method includes:

301, an MME (Mobility Management Entity, mobility management entity) transmits a bearer establishment request to a primary base station.

The bearer establishment request includes a UE and bearer service requirement information corresponding to a bearer to be newly established.

Optionally, the MME may also transmit a bearer deletion request or a bearer modification request to the primary base station.

302, The primary base station determines a secondary base station which establishes the new bearer, and transmits the bearer establishment request to the secondary base station.

Particularly, after receiving the bearer establishment request, the primary base station determines which secondary base station establishes a radio bearer corresponding to the new bearer, according to situations such as service quality requirements of the new bearer to be established, channel quality of each cell and load, and determines a time pattern and/or maximum uplink transmission power of scheduling the corresponding UE by the secondary base station, and incorporates the time pattern and/or the maximum uplink transmission power related information into the bearer establishment request.

303, The secondary base station transmits an RRC connection reconfiguration message to the UE.

The RRC connection reconfiguration message includes configurable parameters related to the new radio bearer.

304, The UE transmits an RRC connection reconfiguration complete message to the secondary base station after the configuration of the new bearer is completed.

It should be noted that, step 303 and step 304 may also be performed between the primary base station and the UE after the following step 305, and at this time, there is no radio signaling bearer between the secondary base station and the UE.

305, The secondary base station transmits a bearer establishment response message to the primary base station.

306, The primary base station transmits a bearer establishment response message to the MME.

307, The secondary base station schedules the UE to perform uplink transmission.

It should be noted that, this step may be performed before step 305.

308, The UE transmits data within a specified time according to an uplink transmission scheduling signaling, and the uplink transmission power is limited to the maximum uplink transmission power.

Compared with the prior art, in this embodiment of the present invention, when the operation of adding, modifying or deleting bearer is performed, the UE corresponding to the bearer is indicated with a corresponding power control adjustment solution, therefore, after the bearer adjustment is completed, is can be ensured that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 4

Figure 4:
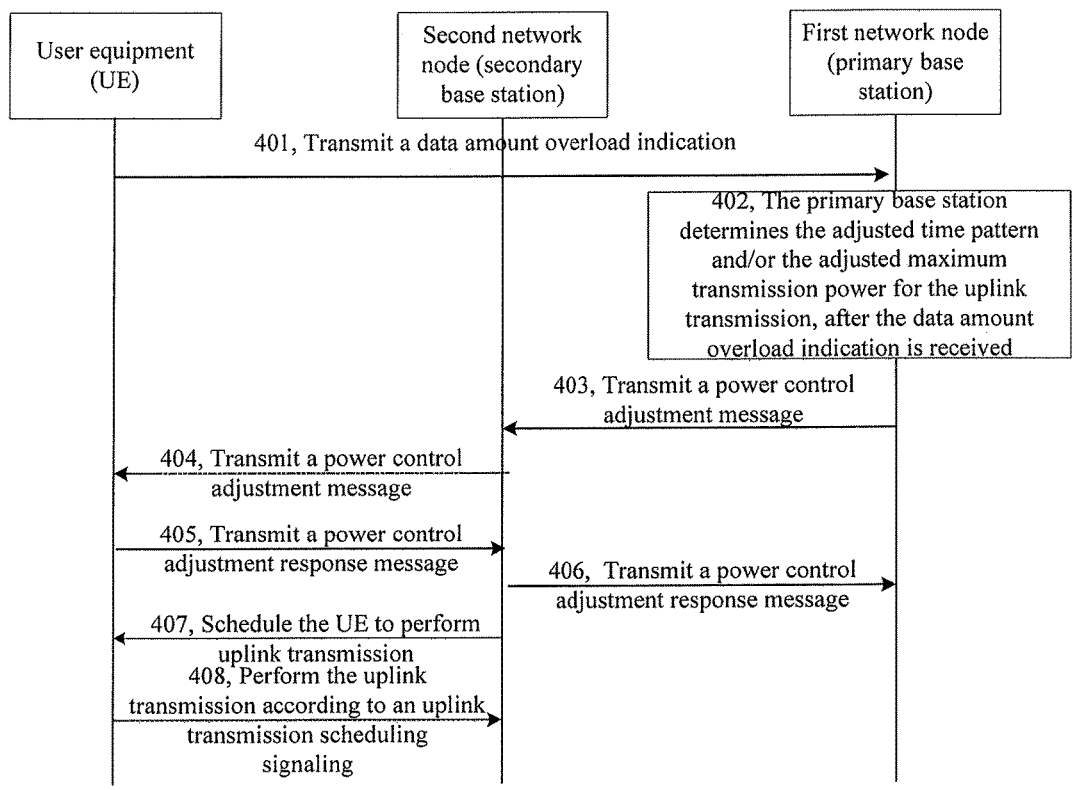
FIG. 4 is a flowchart of a method for uplink power control according to Embodiment 4 of the present invention.

This embodiment provides a method for uplink power control, where a first network node is a primary base station, and a second network node is a secondary base station, as shown in FIG. 4, the method includes:

401, The UE transmits a data amount overload indication to the primary base station, after the buffered data at the UE side exceeds a predetermined threshold.

The predetermined threshold may be pre-defined in a protocol, and may also be configured by a network.

402, The primary base station determines the adjusted time pattern and/or the adjusted maximum uplink transmission power, after the data amount overload indication is received.

Particularly, the primary base station determines to adjust the time pattern and/or the maximum uplink transmission power of the secondary base station, according to situations such as the bearer and channel quality of each serving cell which is in the charge of each aggregation base station.

403, The primary base station transmits a power control adjustment request message to the secondary base station.

The power control adjustment message includes adjustment information such as a subframe pattern, the number of subframes, a maximum transmission power, the adjusted number of subframes or adjusted maximum transmission power. The adjustment information may be a relative value adjustment, and may also be an adjusted absolute value, for example, if the number of subframes or the value of the transmission power needs to be adjusted from 10 to 12, then the relative adjusted value is +2 and the absolute value is 12.

404, The secondary base station transmits a power control adjustment request message to the UE.

The power control adjustment message includes adjustment information of the time pattern and/or the maximum uplink transmission power.

405, The UE transmits a power control adjustment response message to the secondary base station.

It should be noted that, step 404 and step 405 may also be performed directly between the primary base station and the UE, after the secondary base station transmits the power control adjustment response message to the primary base station.

406, The secondary base station transmits a power control adjustment response message to the primary base station.

407, The secondary base station schedules the UE to perform uplink transmission.

408, The UE transmits data within a specified time according to an uplink transmission scheduling signaling, where the uplink transmission power is limited to the maximum uplink transmission power.

Compared with the prior art, in this embodiment of the present invention, the UE notifies the primary base station when the uplink buffered data of the secondary base station exceeds a predetermined threshold, and the primary base station makes adjustment to the time pattern and/or the maximum uplink transmission power of the UE via the secondary base station according to the situation of the buffered data, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 5

Figure 5:
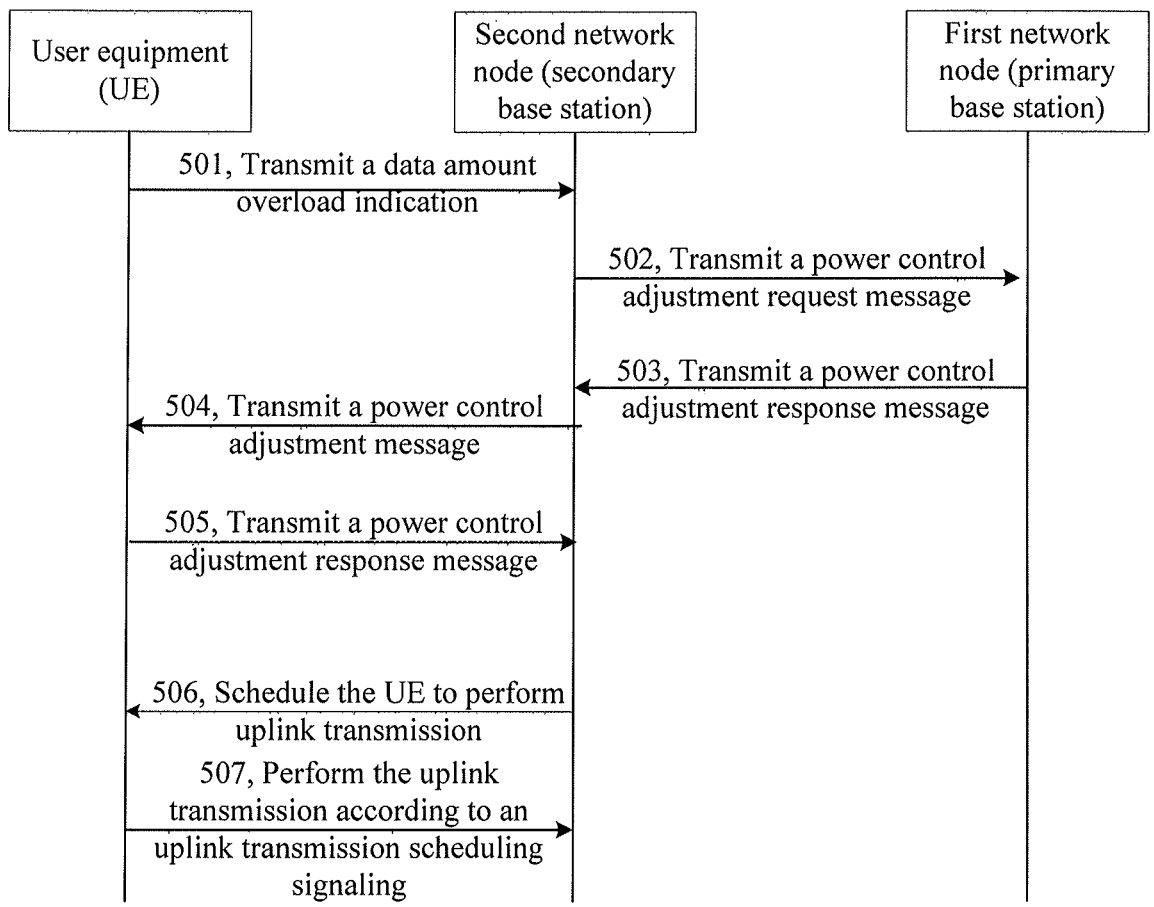
FIG. 5 is a flowchart of a method for uplink power control according to Embodiment 5 of the present invention.

This embodiment provides a method for uplink power control, where a first network node is a primary base station, and a second network node is a secondary base station, as shown in FIG. 5, the method includes:

501, The UE transmits a data amount overload indication to the secondary base station, after the buffered uplink data at the UE side exceeds a predetermined threshold.

The predetermined threshold may be pre-defined in a protocol, and may also be configured by a network.

502, The secondary base station transmits a power control adjustment request message to the primary base station.

The power control adjustment message includes adjustment information such as a subframe pattern, the number of subframes, a maximum transmission power, the adjusted number of subframes or adjusted maximum transmission power. The adjustment information may be a relative value adjustment, and may also be an adjusted absolute value, for example, if the number of subframes or the value of the transmission power needs to be adjusted from 10 to 12, then the relative adjusted value is +2 and the absolute value is 12.

503, The primary base station transmits a power control adjustment response message to the secondary base station.

Particularly, the primary base station determines to adjust the time pattern and/or the maximum uplink transmission power of the secondary base station, according to channel quality of each serving cell which is in the charge of each aggregation base station, and the adjustment information is issued to the secondary base station after incorporating the adjustment information into the power control adjustment response message.

504, The secondary base station transmits a power control adjustment message to the UE.

The power control adjustment message includes the adjustment information of the time pattern and/or the maximum uplink transmission power.

505, The UE transmits a power control adjustment response message to the secondary base station.

506, The secondary base station schedules the UE to perform uplink transmission.

507, The UE transmits data within a specified time according to an uplink transmission scheduling signaling, where the uplink transmission power is limited to the maximum uplink transmission power.

Compared with the prior art, in this embodiment of the present invention, the UE notifies the secondary base station when the uplink buffered data of the secondary base station exceeds a predetermined threshold, the secondary base station requests power control adjustment to the primary base station, and the primary base station makes adjustment to the time pattern and/or the maximum uplink transmission power of the UE via the secondary base station according to the situation of the buffered data, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 6

Figure 6:
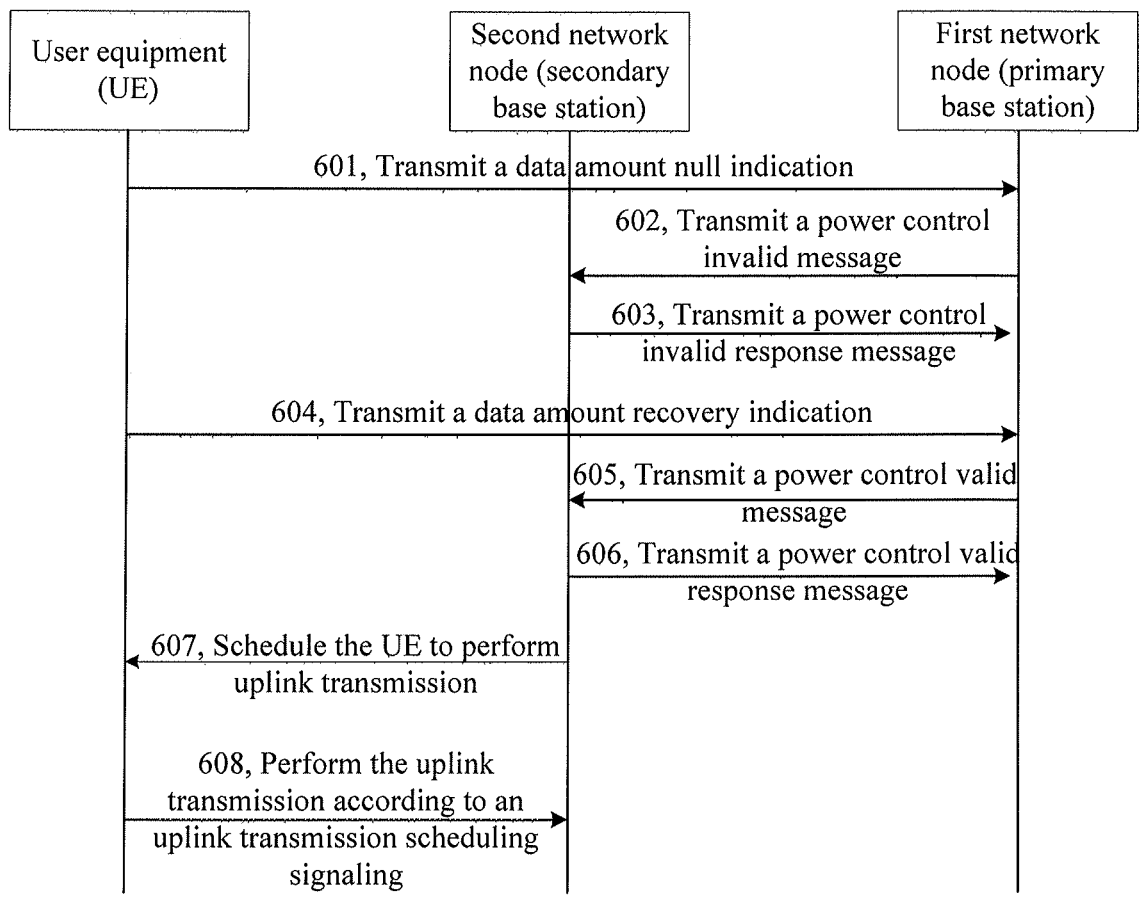
FIG. 6 is a flowchart of a method for uplink power control according to Embodiment 6 of the present invention.

This embodiment provides a method for uplink power control, where a first network node is a primary base station, and a second network node is a secondary base station, as shown in FIG. 6, the method includes:

601, A UE transmits to a primary base station a data amount null indication when uplink buffer corresponding to the secondary base station is null.

Optionally, after the indication is received, the base station performs step 602 if the uplink transmission resources of the secondary base station are expected to be used by the primary base station, otherwise, the process ends.

Optionally, when multiple bearers of the UE belong to the secondary base station, the data amount null indication is transmitted to the primary base station when the uplink buffer corresponding to all these bearers is null.

602, The primary base station transmits a power control invalid message to the secondary base station.

603, The secondary base station transmits a power control invalid response message to the primary base station.

Further, after the power control invalid response message is transmitted, the secondary base station stops scheduling the uplink transmission performed by the UE at the time pattern and/or the maximum transmission power.

It should be noted that, although the uplink scheduling of the UE is not restricted by the uplink time pattern and/or the maximum uplink transmission power any more, the uplink scheduling of the UE in a certain accessed serving cell under the primary base station is still restricted by the maximum uplink transmission power set by the serving cell.

604, When there is data in the uplink buffer of the secondary base station, the UE transmits a data amount recovery indication to the primary base station.

Optionally, the UE may also transmit the data amount recovery indication to the primary base station when buffered data exceeds a threshold or waiting time exceeds a threshold, according to bearer service quality requirements.

605, The primary base station transmits a power control valid message to the secondary base station.

606, The secondary base station transmits a power control valid response message to the primary base station.

Further, after the power control valid response message is transmitted, the secondary base station resumes scheduling the uplink transmission performed by the UE at the time pattern and/or the maximum transmission power.

607, The secondary base station schedules the UE to perform the uplink transmission.

608, The UE transmits data within a specified time according to an uplink transmission scheduling signaling, where the uplink transmission power is limited to the maximum uplink transmission power.

Compared with the prior art, in this embodiment of the present invention, the UE notifies the primary base station when there is no uplink data on a bearer of the secondary base station, the primary base station reclaims the uplink resources allocated to the secondary base station and allocates the reclaimed resources to other aggregation base stations; when the bearer of the secondary base station resumes uplink data transmission, the primary base station re-allocates corresponding uplink resources to the secondary base station, therefore, the carrier resources can be fully utilized, and overall throughput of the base stations in the carrier aggregation scenario can be improved.

Embodiment 7

Figure 7:
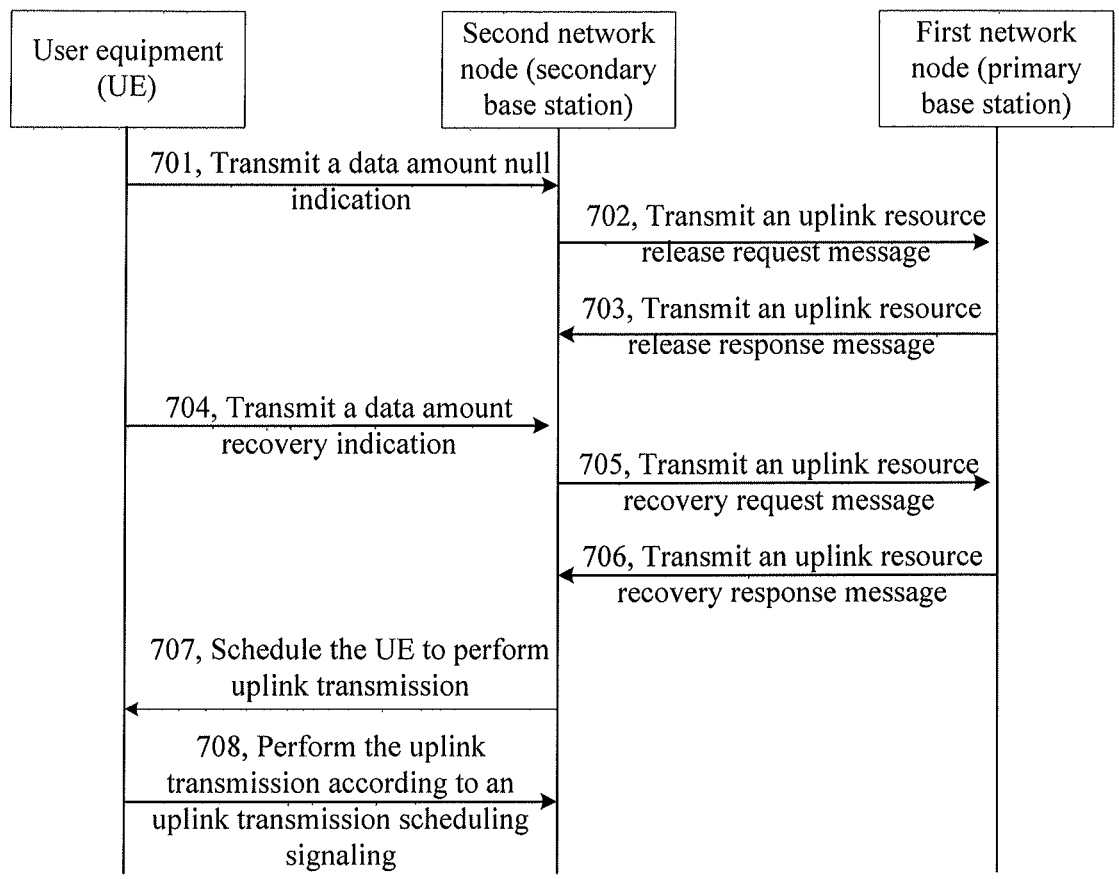
FIG. 7 is a flowchart of a method for uplink power control according to Embodiment 7 of the present invention.

This embodiment provides a method for uplink power control, where a first network node is a primary base station, and a second network node is a secondary base station, as shown in FIG. 7, the method includes:

701, A UE transmits to a secondary base station a data amount null indication when uplink buffer corresponding to the secondary base station is null.

Optionally, when multiple bearers of the UE belong to the secondary base station, the data amount null indication is transmitted to the primary base station only when the uplink buffer corresponding to all these bearers is null.

702, The secondary base station transmits an uplink resource release request message to the primary base station.

Further, after the uplink resource release request message is transmitted, the secondary base station stops scheduling uplink transmission performed by the UE at the time pattern and/or the maximum transmission power.

703, The primary base station transmits an uplink resource release response message to the secondary base station.

It should be noted that, although the uplink scheduling of the UE is not restricted by the uplink time pattern and/or the maximum uplink transmission power any more, the uplink scheduling of the UE in a certain accessed serving cell under the primary base station is still restricted by the maximum uplink transmission power set by the serving cell.

704, When there is data in the uplink buffer of the secondary base station, the UE transmits a data amount recovery indication to the secondary base station.

Optionally, the UE may also transmit the data amount recovery indication to the secondary base station when buffered data exceeds a threshold or waiting time exceeds a threshold, according to bearer service quality requirements.

705, The secondary base station transmits an uplink resource recovery request message to the primary base station.

Further, after the uplink resource recovery request message is transmitted, the secondary base station resumes scheduling the uplink transmission performed by the UE at the time pattern and/or the maximum transmission power.

706, The primary base station transmits an uplink resource recovery response message to the secondary base station.

707, The secondary base station schedules the UE to perform the uplink transmission.

708, The UE transmits data within a specified time according to an uplink transmission scheduling signaling, where the uplink transmission power is limited to the maximum uplink transmission power.

Compared with the prior art, in this embodiment of the present invention, the UE notifies the secondary base station when there is no uplink data on a bearer of the secondary base station, the secondary base station requests the primary base station to release uplink resources of the secondary base station, and the primary base station reclaims the uplink resources allocated to the secondary base station and allocates the reclaimed resources to other aggregation base stations; when the bearer of the secondary base station resumes uplink data transmission, the primary base station re-allocates corresponding uplink resources to the secondary base station, therefore, the carrier resources can be fully utilized, and overall throughput of the base stations in the carrier aggregation scenario can be improved.

Embodiment 8

Figure 8:
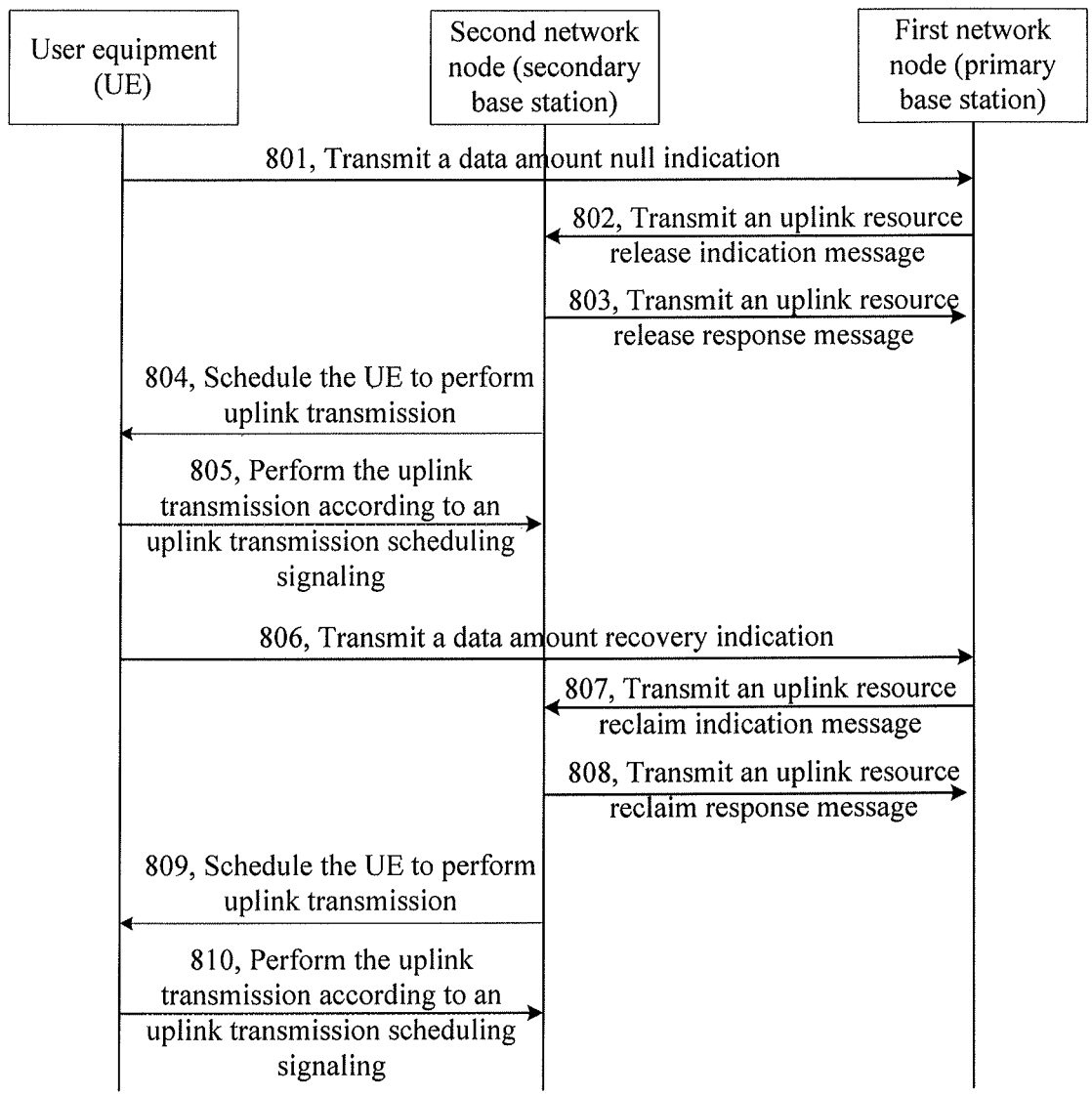
FIG. 8 is a flowchart of a method for uplink power control according to Embodiment 8 of the present invention.

This embodiment provides a method for uplink power control, where a first network node is a primary base station, and a second network node is a secondary base station, as shown in FIG. 8, the method includes:

801, A UE transmits to a primary base station a data amount null indication when uplink buffer corresponding to the primary base station is null.

Optionally, after the indication is received, the primary base station performs step 802 if uplink resources of the primary base station are expected to be used by the secondary base station, otherwise, the process ends.

Optionally, when multiple bearers of the UE belong to the primary base station, the data amount null indication is transmitted to the primary base station only when the uplink buffer corresponding to all these bearers is null.

802, The primary base station transmits an uplink resource release indication message to the secondary base station.

803, The secondary base station transmits an uplink resource release response message to the primary base station.

Further, after the uplink resource release response message is transmitted, the primary base station stops the restriction of scheduling uplink transmission performed by the UE at the time pattern and/or the maximum transmission power.

804, The secondary base station schedules the UE to perform uplink transmission.

805, The UE transmits data according to uplink transmission scheduling.

806, When there is data in the uplink buffer of the primary base station, the UE transmits a data amount recovery indication to the primary base station.

Optionally, the UE may also transmit the data amount recovery indication to the primary base station when buffered data exceeds a threshold or waiting time exceeds a threshold, according to bearer service quality requirements.

807, The primary base station transmits an uplink resource reclaim indication message to the secondary base station.

808, The secondary base station transmits an uplink resource reclaim response message to the primary base station.

Further, after the uplink resource reclaim response message is transmitted, the secondary base station resumes the restriction of scheduling the uplink transmission performed by the UE at the time pattern and/or the maximum transmission power.

809, The secondary base station schedules the UE to perform the uplink transmission.

810, The UE transmits data within a specified time according to an uplink transmission scheduling signaling, where the uplink transmission power is limited to the maximum uplink transmission power.

Compared with the prior art, in this embodiment of the present invention, the UE notifies the primary base station when there is no uplink data on a bearer of the primary base station, the primary base station indicates the secondary base station to pause the restriction of uplink transmission; when a bearer of the primary base station resumes uplink transmission, the primary base station indicates the secondary base station to resume the restriction of uplink transmission, therefore, the carrier resources can be fully utilized, and overall throughput of the base stations in the carrier aggregation scenario can be improved.

Embodiment 9

Figure 9:
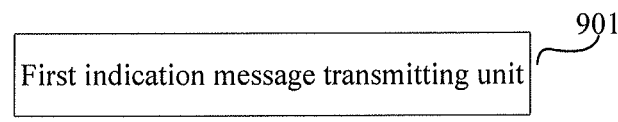
FIG. 9 and FIG. 10 are schematic structural diagrams of a network node according to Embodiment 9 of the present invention.

This embodiment provides a network node, as shown in FIG. 9, the network node includes:

a first indication message transmitting unit 901, configured to transmit a first indication message, to a second network node, where the first indication message includes a time pattern and/or maximum transmission power for an uplink transmission performed by a user equipment (UE) on the second network node, and the time pattern is used for controlling a transmission time of the uplink transmission performed by the UE.

Figure 10:
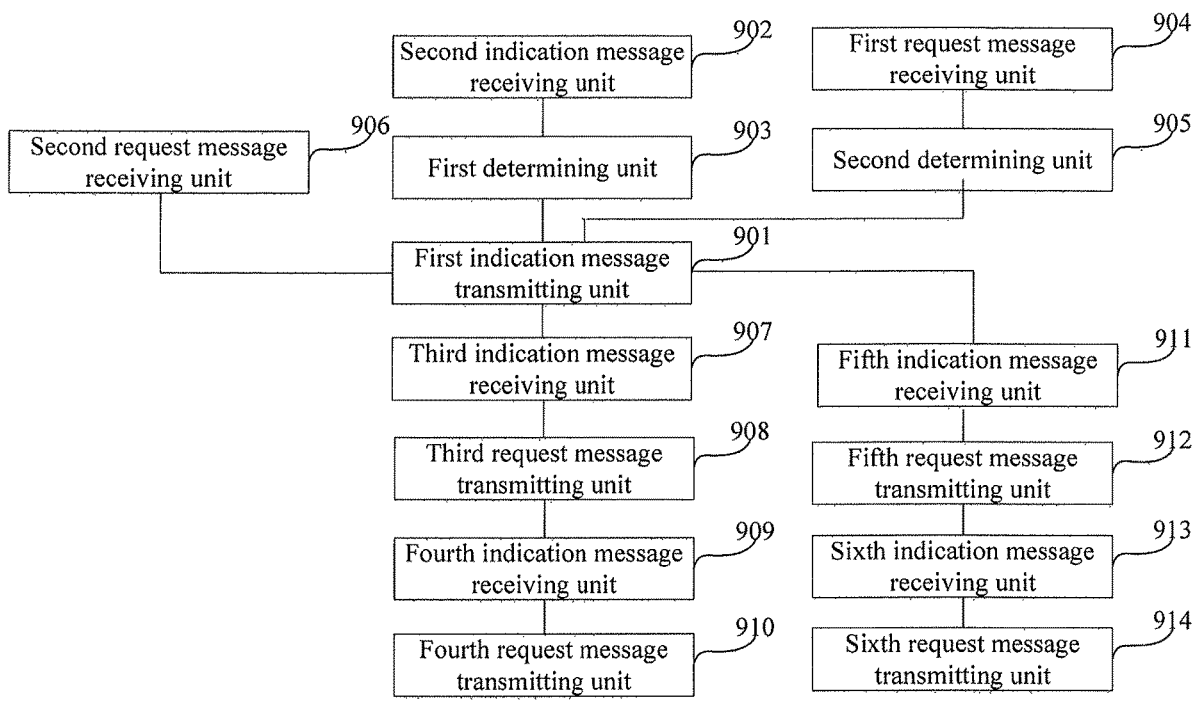

Further, as shown in FIG. 10, the network node may also include:

a second indication message receiving unit 902, configured to receive a second indication message transmitted by the UE, where the second indication message is used for indicating that uplink data, which is buffered by the UE and to be transmitted to the second network node, exceeds a first predetermined threshold; and a first determining unit 903, configured to determine the time pattern and/or the maximum transmission power for the uplink transmission performed by the UE on the second network node.

Further, as shown in FIG. 10, the network node may also include:

a first request message receiving unit 904, configured to receive a first request message transmitted by the second network node, where the first request message is used for requesting the first network node to configure the time pattern and/or the maximum transmission power for the UE; and a second determining unit 905, configured to determine the time pattern and/or the maximum transmission power for the uplink transmission performed by the UE on the second network node.

Further, as shown in FIG. 10, the network node may also include:

a second request message receiving unit 906, configured to receive a second request message transmitted by a mobility management entity (MME), where the second request message includes adding, modifying or deleting a radio bearer between the UE and the second network node.

Further, as shown in FIG. 10, the network node may also include:

a third indication message receiving unit 907, configured to receive a third indication message transmitted by the UE, where the third indication message is used for indicating that there is no uplink data in a transmission buffer of the second network node or data amount of the transmission buffer of the second network node is lower than the second predetermined threshold;

a third request message transmitting unit 908, configured to transmit a third request message to the second network node, where the third request message is used for requesting the second network node to stop scheduling the uplink transmission performed by the UE at the time pattern and/or the maximum transmission power;

a fourth indication message receiving unit 909, configured to receive a fourth indication message transmitted by the UE, where the fourth indication message is used for indicating that a transmission buffer of the second network node is changed from a state of having no uplink data to a state of having uplink data, or the data amount of the transmission buffer of the second network node exceeds a second predetermined threshold; and a fourth request message transmitting unit 910, configured to transmit a fourth request message to the second network node, where the fourth request message is used for requesting the second network node to resume scheduling the uplink transmission performed by the UE at the time pattern and/or the maximum transmission power.

Further, as shown in FIG. 10, the network node also can include:

a fifth indication message receiving unit 911, configured to receive a fifth indication message transmitted by the UE, where the third indication message is used for indicating that there is no uplink data in a transmission buffer of a first network node or data amount of the transmission buffer of the first network node is lower than a third predetermined threshold;

a fifth request message transmitting unit 912, configured to transmit a fifth request message to the second network node, where the fifth request message is used for requesting the second network node to stop scheduling the uplink transmission performed by the UE at the time pattern and/or the maximum transmission power;

a sixth indication message receiving unit 913, configured to receive a sixth indication message transmitted by the UE, where the sixth indication message is used for indicating that a transmission buffer of the first network node is changed from a state of having no uplink data to a state of having uplink data, or the data amount of the transmission buffer of the first network node exceeds the second predetermined threshold; and a sixth request message transmitting unit 914, configured to transmit a sixth request message to the second network node, where the sixth request message is used for requesting the second network node to resume scheduling the uplink transmission performed by the UE at the time pattern and/or the maximum transmission power.

It should be noted that, all the receiving units in this embodiment may be achieved by a receiver; all the transmitting units in this embodiment may be achieved by a transmitter; and all the determining units and processing units in this embodiment may be achieved by a processor.

It should be noted that, the first network node and the second network node may be a base station, a workstation, a server or the like, the first network node in this embodiment can perform actions of the first network node in the above method embodiments, such as a primary base station, and the second network node in this embodiment can perform actions of the second network node in the above method embodiments, such as a secondary base station.

Compared with the prior art, in this embodiment of the present invention, the primary base station indicates, to the user equipment (UE) under the secondary base station, the time pattern and/or the maximum transmission power which is needed for performing the uplink transmission, so as to realize the uplink power control to the UE, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 10

Figure 11:
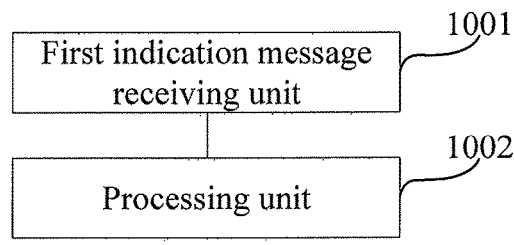
FIG. 11 and FIG. 12 are schematic structural diagrams of a network node according to Embodiment 10 of the present invention.

This embodiment provides a network node, as shown in FIG. 11, the network node includes:

a first indication message receiving unit 1001, configured to receive a first indication message transmitted by a first network node, where the first indication message includes a time pattern and/or a maximum transmission power for an uplink transmission performed by a user equipment (UE) on the second network node; and;

a processing unit 1002, configured to limit scheduling of the uplink transmission performed by the UE to the time pattern and/or the maximum transmission power, according to the first indication message.

Figure 12:
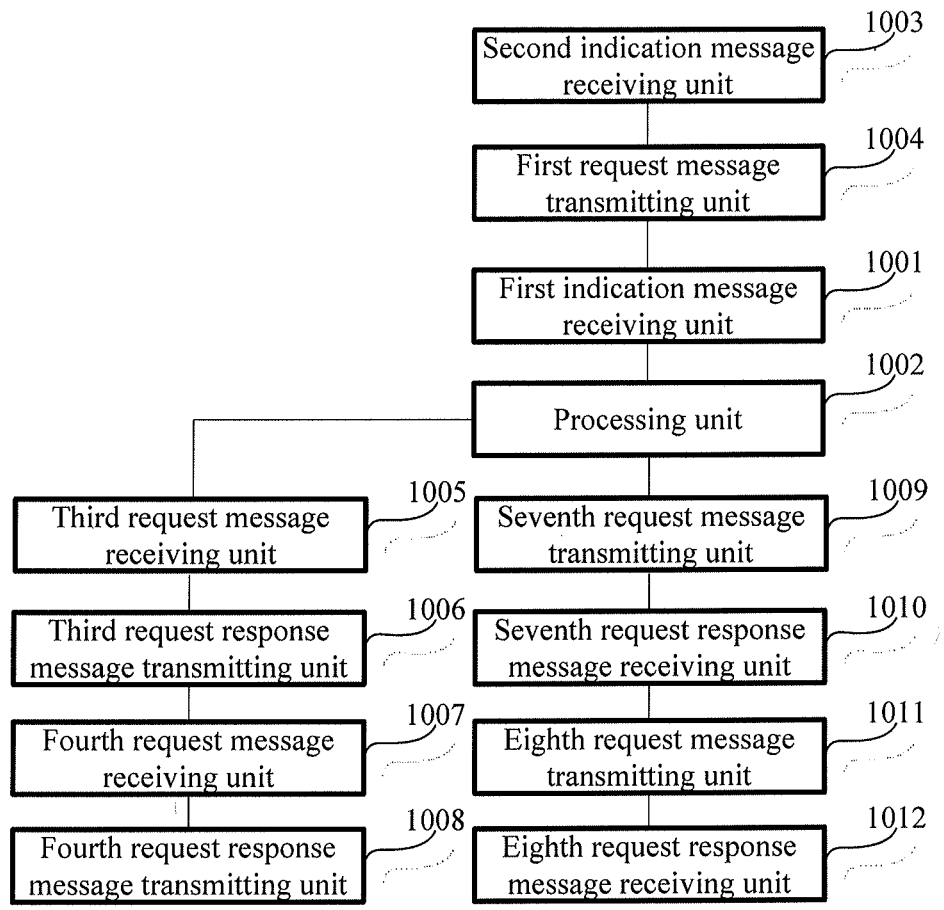

Further, as shown in FIG. 12, the network node may also include:

a second indication message receiving unit 1003, configured to receive a second indication message transmitted by the UE, where the second indication message is used for indicating that uplink data, which is buffered by the UE and to be transmitted to the second network node, exceeds a first predetermined threshold; and a first request message transmitting unit 1004, configured to transmit a first request message to the first network node, where the first request message is used for requesting the first network node to configure the time pattern and/or the maximum transmission power for the UE.

Further, as shown in FIG. 12, the network node also can include:

a third request message receiving unit 1005, configured to receive a third request message transmitted by the first network node, where the third request message is used for requesting the second network node to stop scheduling the uplink transmission performed by the UE at the time pattern and/or the maximum transmission power;

a third request response message transmitting unit 1006, configured to transmit a third request response message to the first network node, where the second network node stops scheduling the uplink transmission performed by the UE at the time pattern and/or the maximum transmission power after transmitting the third request response message;

a fourth request message receiving unit 1007, configured to receive a fourth request message transmitted by the first network node, where the fourth request message is used for requesting the second network node to resume scheduling the uplink transmission performed by the UE at the time pattern and/or the maximum transmission power; and a fourth request response message transmitting unit 1008, configured to transmit a fourth request response message to the first network node, where the second network node schedules the uplink transmission performed by the UE at the time pattern and/or the maximum transmission power after transmitting the fourth request response message.

Further, as shown in FIG. 12, the network node may also include:

a seventh request message transmitting unit 1009, configured to transmit a seventh request message to the first network node when the third indication message transmitted by the UE is received, where both the third indication message and the seventh request message are used for indicating that there is no uplink data in a transmission buffer of the second network node or data amount of the transmission buffer of the second network node is lower than the second predetermined threshold;

a seventh request response message receiving unit 1010, configured to receive a seventh request response message transmitted by the first network node, where the seventh request response message is used for indicating the second network node to stop scheduling the uplink transmission performed by the UE at the time pattern and/or the maximum transmission power;

an eighth request message transmitting unit 1011, configured to transmit an eighth request message to the first network node when the fourth indication message transmitted by the UE is received, where both the fourth indication message and the eighth request message are used for indicating that a transmission buffer of the second network node is changed from a state of having no uplink data to a state of having uplink data, or the data amount of the transmission buffer of the second network node exceeds a second predetermined threshold; and an eighth request response message receiving unit 1012, configured to receive an eighth request response message transmitted by the first network node, where the eighth request response message is used for indicating the second network node to resume scheduling the uplink transmission performed by the UE at the time pattern and/or the maximum transmission power.

It should be noted that, all the receiving units in this embodiment may be achieved by a receiver; all the transmitting units in this embodiment may be achieved by a transmitter; and all the determining units and processing units in this embodiment may be achieved by a processor.

It should be noted that, the first network node and the second network node may be a base station, a workstation, a server or the like, the first network node in this embodiment can perform actions of the first network node in the above method embodiments, such as a primary base station, and the second network node in this embodiment can perform actions of the second network nodes in the above method embodiment, such as a secondary base station.

Compared with the prior art, in this embodiment of the present invention, the secondary base station receives the uplink power indication transmitted by the primary base station, and performs corresponding power control to the UE according to the uplink power indication, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

Embodiment 11

Figure 13:
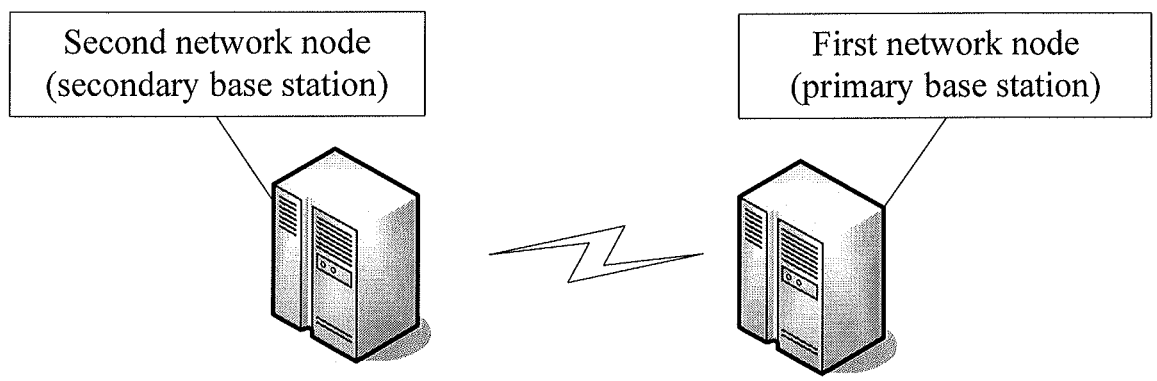
FIG. 13 is a schematic structural diagram of a communication system according to Embodiment 11 of the present invention.

This embodiment provides a communication system, as shown in FIG. 13, the communication system includes the first network node 1101 and the second network node 1102 in the above method embodiments.

Further, the first network node 1101 is used for transmitting a first indication message to a second network node 1102, where the first indication message includes a time pattern and/or a maximum transmission power for the uplink transmission performed by a user equipment (UE) 1103 on the second network node 1102.

Further, the second network node 1102 is used for receiving the first indication message transmitted by the first network node 1101, and limiting scheduling of the uplink transmission performed by the user equipment (UE) to the time pattern and/or the maximum transmission power, according to the first indication message.

Further, the communication system also includes: a user equipment UE 1103, configured to transmit a third indication message to the second network node or the first network node, when there is no uplink data in the transmission buffer of the second network node or data amount of the transmission buffer of the second network node is lower than a first predetermined threshold; transmit a fourth indication message to the second network node or the first network node, when the transmission buffer of the second network node is changed from a state of having no uplink data to a state of having uplink data, or the data amount of the transmission buffer of the second network node exceeds the first predetermined threshold.

Further, the UE 1103 is also used to:

transmit a third indication message to the first network node, when there is no uplink data in the transmission buffer of the first network node or data amount of the transmission buffer of the first network node is lower than a first predetermined threshold; transmit a fourth indication message to the first network node, when the transmission buffer of the first network node is changed from a state of having no uplink data to a state of having uplink data, or the data amount of the transmission buffer of the first network node exceeds the first predetermined threshold.

It should be noted that, the secondary base station and mobility management entity (Mobility Management Entity, MME) do not have a control plane interface.

It should be noted that, in this embodiment, the first network node 1101 is the network node in Embodiment 9; the second network node 1102 is the network node in Embodiment 10, the first network node is a PeNB (Primary eNB, primary base station), and the second network node is a SeNB (Secondary eNB, secondary base station).

Compared with the prior art, in this embodiment of the present invention, the secondary base station receives the uplink power indication transmitted by the primary base station, and performs corresponding power control to the UE according to the uplink power indication, thereby ensuring that the UE can satisfy the transmission power requirements of each base station in a carrier aggregation scenario and, thus, the uplink transmission is performed successfully, the transmission resources of each base station is fully utilized, and the throughput of the UE is improved as much as possible.

The base station and system for uplink power control according to embodiments of the present invention can achieve the method embodiments provided above, for a detailed implementation of specific functions, reference may be made to descriptions in the method embodiments, which will not be described herein again. The method for uplink power control, the base station and the system according to embodiments of the present invention are applicable to uplink power control for a user equipment (UE) in a carrier aggregation scenario, but not limited thereto.

Persons skilled in the art can understand that all or part of the processes in the method provided in the embodiments above may be implemented by a program instructing relevant hardware. The program may be stored in a computer readable storage medium, and when the program is executed, the processes in the method according to the above embodiments are performed. Where, the storage medium may be a floppy disk, an optical disk, read-only memory (Read-Only Memory, ROM) or random access memory (Random Access Memory, RAM) or the like.

The above descriptions are merely preferred embodiments of the present invention, but not intended to limit the protection scope of the present invention. Any modifications, variations or replacement that can be easily derived by persons skilled in the art within the technical range disclosed by the present invention shall fall within the protection scope of the present invention. Therefore, the protection scope of the present invention is subject to the appended claims.

What is claimed is:

1. A method, comprising:
   receiving, by a terminal, a second maximum transmission power value determined by a primary base station, wherein the second maximum transmission power value is directly used for a secondary base station;
   transmitting within the second maximum transmission power value, by the terminal, the second uplink data to the secondary base station;
   transmitting, by the terminal, a first uplink data to the primary base station; and
   sending, by the terminal, a third indication to the primary base station, the third indication indicating that a transmission buffer of the secondary base station is changed from a state of having no uplink data to a state of having uplink data, or indicating that a data amount of data in the transmission buffer of the secondary base station exceeds a third predetermined threshold, the third indication triggering the primary base station to request the secondary base station to resume scheduling uplink transmission within the maximum transmission power value.

2. The method according to claim 1, further comprising:
   determining, by the primary base station, a first maximum transmission power value for the primary base station;
   wherein the transmitting the first uplink data further comprising:
   transmitting within the first maximum transmission power value, by the terminal, the first uplink data to the primary base station.

3. The method according to claim 2, further comprising:
   receiving, by the primary base station, a first request message from the secondary base station to request the primary base station to configure the second maximum transmission power value for the second uplink data.

4. The method according to claim 1, further comprising:
   receiving, by the secondary base station, the second maximum transmission power value from the primary base station.

5. The method according to claim 1, further comprising:
   receiving, by the terminal, a request for adjusting power control from the secondary base station.

6. The method according to claim 1, further comprising:
   sending, by the terminal, a first indication to the primary base station, the first indication indicating that uplink data buffered by the terminal to be transmitted to the secondary base station exceeds a first predetermined threshold, the first indication triggering the primary base station to determine the maximum transmission power value.

7. The method according to claim 1, further comprising:
   receiving, by the primary base station, a second request message from a mobility management entity (MME), the second request message requesting adding, modifying or deleting a radio bearer between the terminal and the secondary base station.

8. The method according to claim 1, further comprising:
   sending, by the terminal, a second indication to the primary base station, the second indication indicating that there is no uplink data in a transmission buffer of the secondary base station or indicating that a data amount of data in the transmission buffer of the secondary base station is lower than a second predetermined threshold, the second indication triggering the primary base station to request the secondary base station to stop scheduling uplink transmission within the maximum transmission power value.

9. The method according to claim 1, further comprising:
   sending, by the terminal, a fourth indication to the primary base station, the fourth indication indicating that there is no uplink data in a transmission buffer of the primary base station or indicating that a data amount of data in the transmission buffer of the primary base station is lower than a fourth predetermined threshold, the fourth indication triggering the primary base station to request the secondary base station to stop restriction of scheduling uplink transmission within the maximum transmission power value.

10. The method according to claim 1, further comprising: sending, by the terminal, a fifth indication to the primary base station, the fifth indication indicating that a transmission buffer of the primary base station is changed from a state of having no uplink data to a state of having uplink data, or indicating that a data amount of data in the transmission buffer of the primary base station exceeds the fifth predetermined threshold, the fifth indication triggering the primary base station to request the secondary base station to resume restriction of scheduling uplink transmission within the maximum transmission power value.

11. An apparatus comprising:
a receiver configured to receive a second maximum transmission power value determined by a primary base station, wherein the second maximum transmission power value is directly used for a secondary base station; and
a transmitter coupled to the receiver, the transmitter configured to:
transmit within the second maximum transmission power value, the second uplink data to the secondary base station;
transmit a first uplink data to the primary base station; and
send a third indication to the primary base station, the third indication indicating that a transmission buffer of the secondary base station is changed from a state of having no uplink data to a state of having uplink data, or indicating that a data amount of data in the transmission buffer of the secondary base station exceeds a third predetermined threshold, the third indication triggering the primary base station to request the secondary base station to resume scheduling uplink transmission within the maximum transmission power value.

12. The apparatus according to claim 11, the receiver is further configured to receive a request for adjusting power control from the secondary base station.

13. The apparatus according to claim 11, wherein the transmitter is further configured to send a first indication to the primary base station, the first indication indicating that uplink data buffered by the terminal to be transmitted to the secondary base station exceeds a first predetermined threshold, the first indication triggering the primary base station to determine the maximum transmission power value.

14. The apparatus according to claim 11, wherein the transmitter is further configured to send a second indication to the primary base station, the second indication indicating that there is no uplink data in a transmission buffer of the secondary base station or indicating that a data amount of data in the transmission buffer of the secondary base station is lower than a second predetermined threshold, the second indication triggering the primary base station to request the secondary base station to stop scheduling uplink transmission within the maximum transmission power value.

15. The apparatus according to claim 11, wherein the transmitter is further configured to send a fourth indication to the primary base station, the fourth indication indicating that there is no uplink data in a transmission buffer of the primary base station or indicating that a data amount of data in the transmission buffer of the primary base station is lower than a fourth predetermined threshold, the fourth indication triggering the primary base station to request the secondary base station to stop restriction of scheduling uplink transmission within the maximum transmission power value.

16. The apparatus according to claim 11, wherein the transmitter is further configured to send a fifth indication to the primary base station, the fifth indication indicating that a transmission buffer of the primary base station is changed from a state of having no uplink data to a state of having uplink data, or indicating that a data amount of data in the transmission buffer of the primary base station exceeds the fifth predetermined threshold, the fifth indication triggering the primary base station to request the secondary base station to resume restriction of scheduling uplink transmission within the maximum transmission power value.

* * * * *